United States Patent
Lee et al.

(10) Patent No.: US 12,112,168 B1
(45) Date of Patent: Oct. 8, 2024

(54) METHOD FOR PROCESSING MULTIPLE TRANSACTIONS CONVERTED FROM SINGLE TRANSACTION IN PROCESSOR, AND PROCESSOR FOR PERFORMING SAME

(71) Applicant: MetisX CO., Ltd., Yongin-si (KR)

(72) Inventors: Kwang Sun Lee, Yongin-si (KR); Do Hun Kim, Yongin-si (KR); Kee Bum Shin, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/644,249

(22) Filed: Apr. 24, 2024

(30) Foreign Application Priority Data

Jul. 18, 2023 (KR) .................. 10-2023-0093167

(51) Int. Cl.
*G06F 9/30* (2018.01)
(52) U.S. Cl.
CPC ...... *G06F 9/30047* (2013.01); *G06F 9/30043* (2013.01); *G06F 9/3009* (2013.01); *G06F 9/3004* (2013.01)
(58) Field of Classification Search
CPC .............. G06F 9/3004; G06F 9/30043; G06F 9/30047; G06F 9/3009
USPC ........................................................ 711/154
See application file for complete search history.

(56) References Cited

U.S. PATENT DOCUMENTS

| | | | | |
|---|---|---|---|---|
| 6,957,320 | B2* | 10/2005 | Senter | G06F 9/3834 |
| | | | | 712/E9.046 |
| 7,000,097 | B2* | 2/2006 | Senter | G06F 9/3853 |
| | | | | 712/E9.046 |
| 2013/0080737 | A1* | 3/2013 | Reid | G06F 9/30087 |
| | | | | 712/201 |
| 2017/0091102 | A1* | 3/2017 | Wright | G06F 9/3824 |
| 2018/0165199 | A1* | 6/2018 | Brandt | G06F 9/384 |
| 2021/0349823 | A1* | 11/2021 | Karm | G06F 12/0855 |
| 2022/0035632 | A1* | 2/2022 | Cain, III | G06F 9/30181 |
| 2024/0013038 | A1* | 1/2024 | Kim | G06F 12/0846 |

* cited by examiner

*Primary Examiner* — Than Nguyen
(74) *Attorney, Agent, or Firm* — Studebaker & Brackett PC

(57) ABSTRACT

A method for processing multiple transactions converted from a single transaction related to each of a plurality of threads is provided, in which the method is performed by a processor including at least one core and includes converting a first transaction related to at least one of the plurality of threads into a plurality of second transactions, transferring, by a load-store unit (LSU) of the core, the plurality of second transactions to a subordinate or a cache, receiving, by the LSU, a plurality of data units related to the second transactions from the subordinate or the cache, and merging, by the LSU, the plurality of data units, in which the LSU is configured to further transfer interleaving deactivation information that causes the subordinate or the cache to deactivate interleaving.

12 Claims, 8 Drawing Sheets

METHOD FOR PROCESSING MULTIPLE TRANSACTIONS CONVERTED FROM SINGLE TRANSACTION IN PROCESSOR, AND PROCESSOR FOR PERFORMING SAME

CROSS-REFERENCE TO RELATED APPLICATION

This application claims priority under 35 U.S.C. § 119 to Korean Patent Application No. 10-2023-0093167, filed in the Korean Intellectual Property Office on Jul. 18, 2023, the entire contents of which are hereby incorporated by reference.

BACKGROUND

Technical Field

The present disclosure relates to a method for processing multiple transactions converted from a single transaction in a processor and a processor for performing the same.

Description of the Related Art

A processor may include a plurality of cores. A load-store unit (LSU) of the core is a component configured to transfer data between the core's register and memory. Storing data in the memory may be referred to as a store, and fetching data from the memory and extracting it into the register may be referred to as a load. In more general terms, LSU can be understood as a component of a core configured to allow the core to interface with other components (e.g., cache, memory, or other components communicating through a bus).

System on Chip (SoC) is a technology and product that integrates various semiconductor components, and unlike the related art that has several semiconductors forming a system, the system is present in one chip. A bus may be used to implement a data transfer path that provides a method of connection and management between the functional blocks forming the SoC.

Advanced Microcontroller Bus Architecture (AMBA) is widely used as a representative architecture for bus design standards. AMBA is a standard system bus design specification developed and published by ARM. Using the standard AMBA bus has advantages such as easy communication between SoC designers, reduced SoC design time because ideas can be shared according to standards, ease of reusing Intellectual Property (IP), reduced SoC design time by the introduction of external standard IP, and so on.

The AMBA buses can be divided into Advanced High Performance Bus (AHB), Advanced System Bus (ASB), Advanced Peripheral Bus (APB), Advanced extensible Interface (AXI), etc. Among these bus types, AXI is a bus protocol that has fast speed and eliminates bottlenecks, and is characterized in that the channels related to read, write, write response, etc. are operated independently, address/control/data phases can be separated, unaligned data transfer can be supported, burst-based transactions can be used, out-of-order transactions are supported, etc.

In particular, because AXI supports interleaving, when a transaction to read data is performed by a plurality of threads from a manager component, the data of each thread ID may be mixed and transferred without order constraints. There are cases in which the out-of-order processing can be beneficial for improving system performance, but depending on situations, the out-of-order processing can be inefficient.

For example, when loading data from the memory, the LSU of the general-purpose processor may convert the load into multiple transactions for optimization for the core and internal cache (or local cache) internal structure and transfer the converted transactions. The converted transactions should be converted back into one transaction inside the LSU. However, as described above, in a situation in which a plurality of threads are used and the bus protocol supporting interleaving is used, there is a problem that it is difficult to efficiently utilize the storage space of the buffer.

The technical challenge of the present disclosure is to provide a technique for efficiently performing reconversion in a scenario in which multiple transactions corresponding to one thread are reconverted into one transaction.

The technical challenge of the present disclosure is to provide a technique for signaling interleaving deactivation information to a subordinate or cache such that the LSU may efficiently process such transactions when a transaction related to a specific thread is converted into the multiple transactions.

The technical challenge of the present disclosure is to provide a technique for merging a plurality of data units for each of a plurality of threads while simply requiring only a single internal data buffer.

The technical challenge of the present disclosure is to provide a technique capable of optimizing an area and power for the internal data buffer to improve computing performance.

SUMMARY

The present disclosure may be implemented in various ways including an apparatus, a system, a method, or a computer program stored in a readable storage medium.

As an aspect of the present disclosure, a method for processing multiple transactions converted from a single transaction related to each of a plurality of threads is disclosed. The method is performed by a processor including at least one core, and may include converting a first transaction related to at least one of the plurality of threads into a plurality of second transactions, transferring, by a load-store unit (LSU) of the core, the plurality of second transactions to a subordinate or a cache, receiving, by the LSU, a plurality of data units related to the second transactions from the subordinate or the cache, and merging, by the LSU, the plurality of data units, in which the LSU may be configured to further transfer interleaving deactivation information that causes the subordinate or the cache to deactivate interleaving.

The interleaving deactivation information may be transferred using a user signal or a sideband signal of the AXI protocol.

The subordinate or the cache receiving the interleaving deactivation information may be configured to successively transfer the plurality of data units to the LSU.

The receiving, by the LSU, the plurality of data units related to the second transactions from the subordinate or the cache may include storing, by the subordinate or the cache receiving the interleaving deactivation information, at least some of the plurality of data units in a data buffer in the LSU, in which the plurality of data units may be all associated with a same thread.

The merging, by the LSU, the plurality of data units may include, when a last data unit of the plurality of data units is received by the LSU, merging, by the LSU, the last data unit and the data units stored in the data buffer.

After the merging by the LSU the plurality of data units, the LSU may be configured to transfer interleaving activation information that causes the subordinate or the cache to reactivate interleaving.

As an aspect of the present disclosure, a processor for performing a method for processing multiple transactions converted from a single transaction for each of the plurality of threads is disclosed. The processor may include at least one core, and the method may include converting a first transaction related to at least one of the plurality of threads into a plurality of second transactions, transferring, by a load-store unit (LSU) of the core, the plurality of second transactions to a subordinate or a cache; receiving, by the LSU, a plurality of data units related to the second transactions from the subordinate or the cache, and merging, by the LSU, the plurality of data units, in which the LSU may be configured to further transfer interleaving deactivation information that causes the subordinate or the cache to deactivate interleaving.

The interleaving deactivation information may be transferred using a user signal or a sideband signal of the AXI protocol.

The subordinate or the cache receiving the interleaving deactivation information may be configured to successively transfer the plurality of data units to the LSU.

The receiving, by the LSU, the plurality of data units related to the second transactions from the subordinate or the cache may include storing, by the subordinate or the cache receiving the interleaving deactivation information, at least some of the plurality of data units in a data buffer in the LSU, in which the plurality of data units may be all associated with a same thread.

The merging, by the LSU, the plurality of data units may include, when a last data unit of the plurality of data units is received by the LSU, merging, by the LSU, the last data unit and the data units stored in the data buffer.

After the merging by the LSU the plurality of data units, the LSU may be configured to transfer interleaving activation information that causes the subordinate or the cache to reactivate interleaving.

According to various examples of the present disclosure, it is possible to provide a technique for efficiently performing reconversion in a scenario in which multiple transactions corresponding to one thread are reconverted into one transaction.

According to various examples of the present disclosure, it is possible to provide a technique for signaling interleaving deactivation information to a subordinate or a cache such that the LSU may efficiently process such transactions when a transaction related to a specific thread is converted into multiple transactions.

According to various examples of the present disclosure, it is possible to provide a technique for merging a plurality of data units for each of a plurality of threads while simply requiring only a single internal data buffer.

The present disclosure can provide a technique capable of optimizing an area and power for the internal data buffer to improve computing performance.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
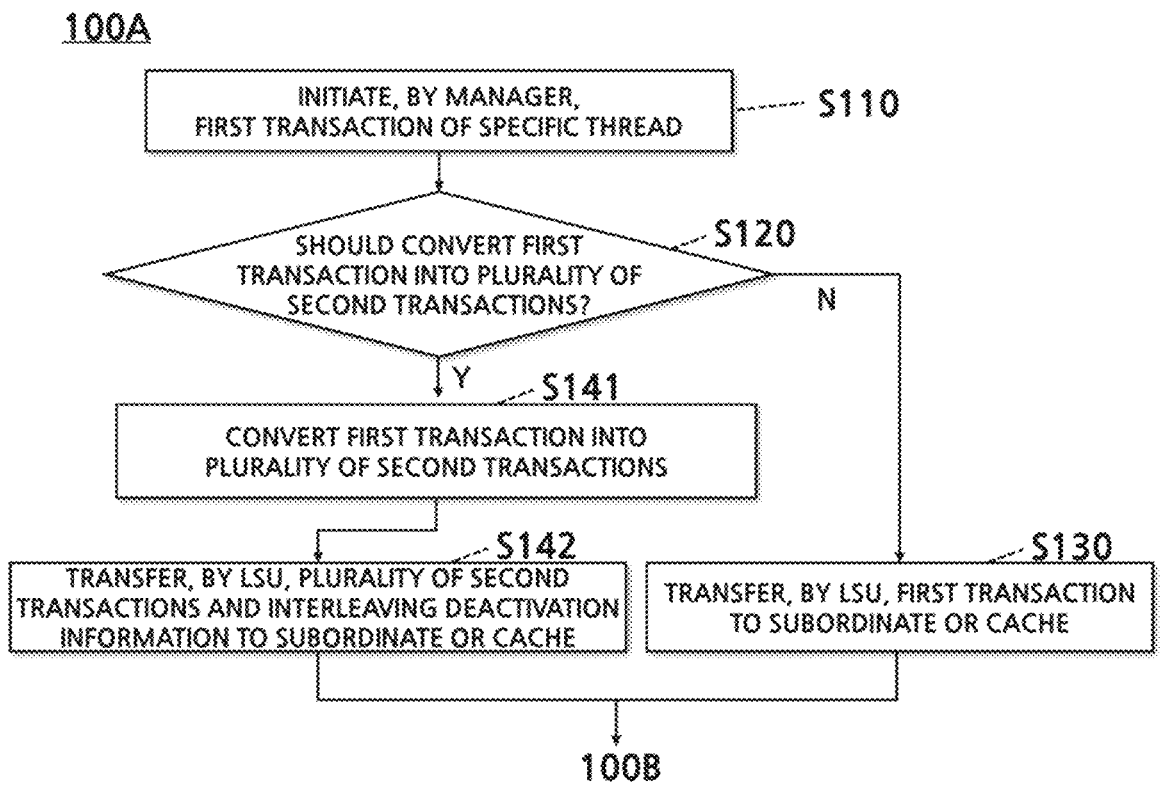
FIG. 1 is a flowchart illustrating a method for processing transactions.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Figure 2:
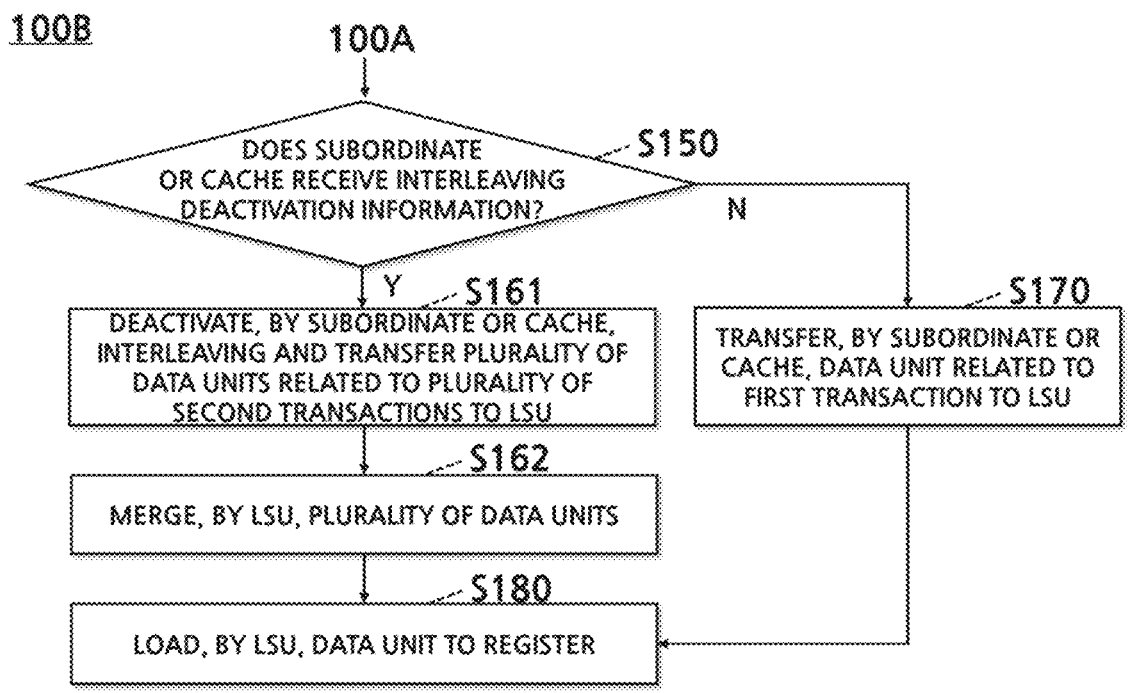
FIG. 2 is a flowchart illustrating a method for processing transactions.
Figure 3:
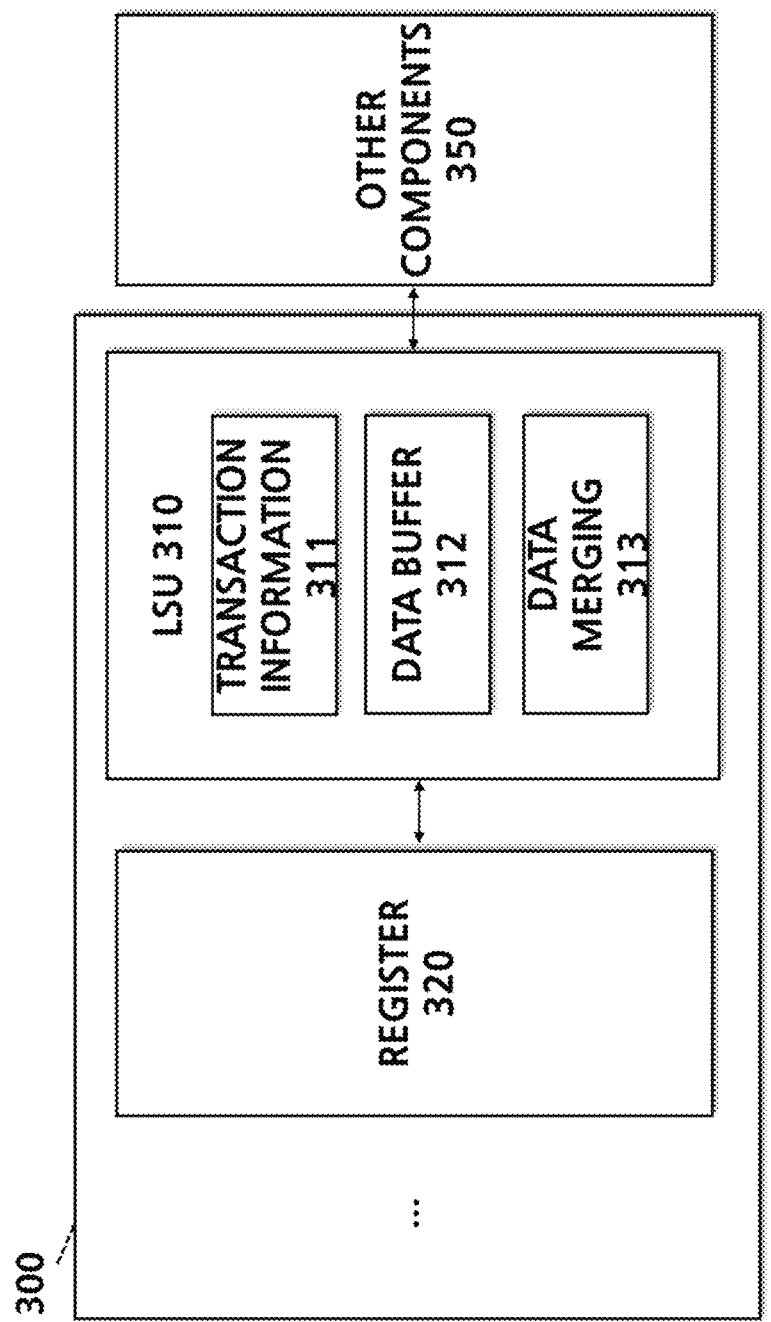
FIG. 3 is a diagram conceptually illustrating a processor for performing a method for processing transactions.

FIGS. 1 and 2 are flowcharts respectively illustrating a method for processing transactions. After performing a method 100A illustrated in FIG. 1, a method 100B illustrated in FIG. 2 may be subsequently performed. FIG. 3 is a diagram conceptually illustrating a processor for performing a method for processing transactions.

First, a process of generally processing a transaction in a processor will be described with reference to FIG. 3. For reference, FIG. 3 may illustrate only some of the components included in a core 300 in the processor to describe some examples of the present disclosure. Therefore, it goes without saying that another components may also be included in the core 300 in addition to the components explicitly illustrated in FIG. 3.

In order for the processor to execute an instruction, it generally goes through a process called an instruction cycle. The instruction cycle is also referred to as the fetch-decode-execute cycle. In the fetch stage, a fetch circuit fetches instructions to be executed by the core 300. For example, the fetch circuit may read the instruction using the program counter PC as an input. In the decode stage, a decoding circuit may interpret the instruction to determine which operation is to be performed, and generate control signals necessary for performing the operation. These control signals may be used to control so that the instruction is executed correctly at a subsequent stage of the pipeline. In the execute stage, an execute circuit may actually perform the operation according to the instruction. If the instruction requires an operand, the instruction may also be read from the register. In the execute stage, an arithmetical logic unit (ALU) or other execution unit may be operated to process appropriate operations according to the instruction.

If the instruction is executed through the instruction cycle described above, result data calculated after completion of the operation may be stored in the register 320. The result value stored in the register is first stored in the register 320, but may eventually be transferred to a destination outside the core 300. For example, the destination outside the core 300 may be other components 350 illustrated in FIG. 3 (e.g., external cache, memory, subordinate, etc.).

As illustrated in FIG. 3, the core 300 may include a load-store unit (LSU) 310 to interface with the other components 350 outside the core 300. The LSU 310 may be used for transferring the data value stored in the register 320 to a destination outside the core 300.

The LSU 310 may also be referred to as a load-store engine or a load engine. The term "LSU" 310 as used herein may be understood as a generic term for a concept that may be interfaced through a bus with the other components 350 (e.g., external cache, memory, subordinate, etc.) outside the core 300.

Meanwhile, although not illustrated in FIG. 3, the core 300 may further include an internal cache (or a local cache). The internal cache is slower than the register 320 but may provide a larger storage space. In addition, the internal cache may be a storage that is faster and provides less storage space than the external cache. In performing an operation of loading data of a predetermined address into the register or storing data into a memory at a predetermined address, the LSU 310 may first check if the corresponding data can be obtained from the internal cache before interfacing with an external cache or memory. When data of a corresponding address is hit in the internal cache, the data may be stored in or read from the corresponding location of the internal cache even without interfacing with an external cache or memory.

The cache may also be present outside the core 300. This external cache may be distinguished from the internal cache in that it may interface with the LSU 310 through a bus. Whether the cache is an internal cache or an external cache may be defined from the perspective of the manager initiating the transaction.

However, the term 'cache' as used herein is not interpreted as being limited to any one of the internal cache or the external cache within the technically implementable scope of the disclosure unless the internal cache or the external cache is specifically mentioned. That is, the cache may collectively refer to any cache, buffer, or other storage structure that may hold a copy of data value for a specific address location.

Hereinafter, a method for processing transactions according to some examples of the present disclosure will be described with reference to FIGS. 1 to 3.

As illustrated in FIG. 1, the method 100A for processing transactions may include, by a manager, initiating (S110) a first transaction of a specific thread. The term manager may be used interchangeably with the term master, and may mean an agent that starts a transaction. As a concept in contrast to the manager, the term 'subordinate' may be used, and the subordinate may be used interchangeably with the term slave, and the subordinate may mean an agent that receives and responds to a request. The manager initiates a transaction to communicate with the subordinate. Generally, a transaction requires information that managers and subordinates need to exchange through multiple channels. That is, it can be understood that the transaction is initiated by the manager in order for the manager and the subordinate to exchange information with each other.

Following initiating (S110) the first transaction, whether or not the first transaction should be converted into a plurality of second transactions may be determined (S120). This determining (S120) may include determining whether the size of the transaction conforming to the ISA instruction is the same as the register size of the core 300, for example. For example, ISA generally supports instructions of the same size as the register in the processor, but may also support instructions larger than the register size. For example, it may have a register size of 4 bytes (i.e., 32 bits), and support 8 bytes (i.e., 64 bits) of instruction. Alternatively, it may have a register size of 8 bytes (i.e., 64 bits), and support 16 bytes (i.e., 128 bits) of instruction. This provides scalability for efficient use of processors, and also is a means for users and developers to support a wide range of software development tools.

If the determining (S120) determines that it is not necessary to convert the first transaction into a plurality of second transactions, the first transaction may be transferred (S130) to the subordinate or cache without particular conversion. For example, in the example described above, if the size of the transaction conforming to the ISA instruction is the same as the register size of the core 300, the LSU 310 may transfer the transaction to the subordinate or cache without particular conversion of the transaction.

For example, if the register size is 8 bytes and the size of the transaction conforming to the ISA instruction is also 8 bytes, the LSU 310 may transfer the execution result of the ISA instruction executed through the instruction cycle to the cache. In the example described in FIG. 1, no intermediate steps are illustrated between the determining (S120) and the transferring (S130), but additional stages such as the execute stage may also be included between the determining (S120) and the transferring (S130).

If it is determined as a result of the determining (S120) that the first transaction should be converted into a plurality of second transactions, the first transaction may be converted (S141) into a plurality of second transactions. For example, if the size of the transaction conforming to the ISA instructions is different from the register size of the core 300 (e.g., if the former is larger than the latter), the transaction may be converted into multiple transactions conforming to the register size of the core.

Following the converting (S141), the LSU 310 may perform transferring (S142) a plurality of second transactions to a subordinate or cache together with predetermined interleaving deactivation information. Meanwhile, rather than transferring the plurality of second transactions discontinuously, the LSU 310 may be configured to continuously transfer the plurality of second transactions to the subordinate or the cache.

The converting (S141) may be performed by the decoding circuit. Although not explicitly illustrated in FIG. 1, an execute stage performed by the execute circuit may be further included, which is a stage after the converting (S141) is performed by the decoding circuit and before the transferring (S142) is performed by the LSU 310.

Meanwhile, the component that performs the converting (S141) is not limited to the decoding circuit. Depending on methods of implementation, both the converting (S141) and the transferring (S142) may be performed by the LSU 310.

The interleaving deactivation information is signaling information used for temporarily stopping the interleaving operation. That is, since a plurality of second transactions are converted from the first transaction, a signal to temporarily stop interleaving may be transferred using the interleaving deactivation information. For example, the interleaving deactivation information may be transferred using a user signal or a sideband signal of the AXI protocol.

The LSU 310 may transfer such interleaving deactivation information to other components (that is, because one first transaction is converted into multiple second transactions, information that temporarily stops interleaving such that they can be efficiently processed all at once is transferred). By doing so, there is an advantage in that other components such as subordinates or caches are able to process these transactions as the related transactions rather than as the separate and irrelevant transactions. For example, if a single load or store transaction is converted into multiple transactions in accordance with the register size and the LSU 310 transfers these converted transactions to the subordinate or cache, because the interleaving function is temporarily deactivated, the transactions may not be individually processed. That is, there is an advantage in that the process of merging back into one transaction can be efficiently processed.

A method of utilizing interleaving deactivation information will be described in more detail with reference to FIG. 2. The subordinate or cache may determine (S150) whether interleaving deactivation information is received. For example, if the interleaving deactivation information is represented using AXI user bits, and if the bit is 1 (but this is an example and the fact that there has been conversion may be represented as 0 depending on the methods of implementation), this may be interpreted as meaning that the information indicating to deactivate the interleaving is received.

As a result of performing the determining (S150) the interleaving deactivation information, if it is determined that the information indicating to deactivate interleaving is received, the subordinate or cache receiving the interleaving deactivation information may temporarily stop (i.e., deactivate) the interleaving function on a bus for interfacing with the LSU 310. In addition, a plurality of data units for a plurality of second transactions (e.g., a plurality of data units each associated with the second transactions, which are a plurality of data units representing the information that the subordinate needs to transfer to the manager) may be transferred to the LSU (S161).

The transferring (S161) the plurality of data units may include storing, by the subordinate or cache receiving the interleaving deactivation information, at least some of the plurality of data units in a data buffer in the LSU, in which the plurality of data units may all be associated with the same thread. Details of the operations mentioned above will be described below with reference to FIGS. 5, 7 and 8.

The LSU receiving a plurality of data units may merge (S162) the data units. In addition, the LSU 310 may transfer (S180) the merged data unit to load into the register 320 (e.g., GPR). The merging (S162) may be performed by a data merge unit of the LSU 310.

However, if the result of determining the interleaving deactivation information (S150) indicates that deactivating the interleaving is not required (or, if no conversion information is transferred to the subordinate or cache), the subordinate or cache may transfer (S170) the data unit related to the first transaction (e.g., data unit associated with the first transaction, which is a data unit representing information to be transferred by the subordinate to the manager) to the LSU, without processing separate interleaving deactivation for the received transaction (i.e., this transaction is a transaction transferred through S130 and was not divided and converted). In addition, the LSU 310 may transfer (S180) the received data unit to load into the register 320 (e.g., GPR).

As illustrated in FIG. 3, the LSU 310 may include a transaction information unit 311 for storing information on individual transactions and performing signaling for each transaction, a data buffer unit 312 for temporarily storing a plurality of data units related to a plurality of second transactions, and a data merge unit 313 for merging a plurality of data units related to a plurality of second transactions.

Hereinafter, the concept of processing transactions without stopping interleaving will be presented with reference to FIGS. 4 and 6. Then the concept of stopping interleaving and processing transactions will be described with reference to FIGS. 5, 7 and 8. It may be understood that the concept of the latter (i.e., description referring to FIGS. 5 and 7) corresponds the description of examples of the present disclosure, and the concept of the former herein (i.e., description referring to FIGS. 4 and 6) is presented as a comparative example of the examples of the present disclosure.

Figure 4:
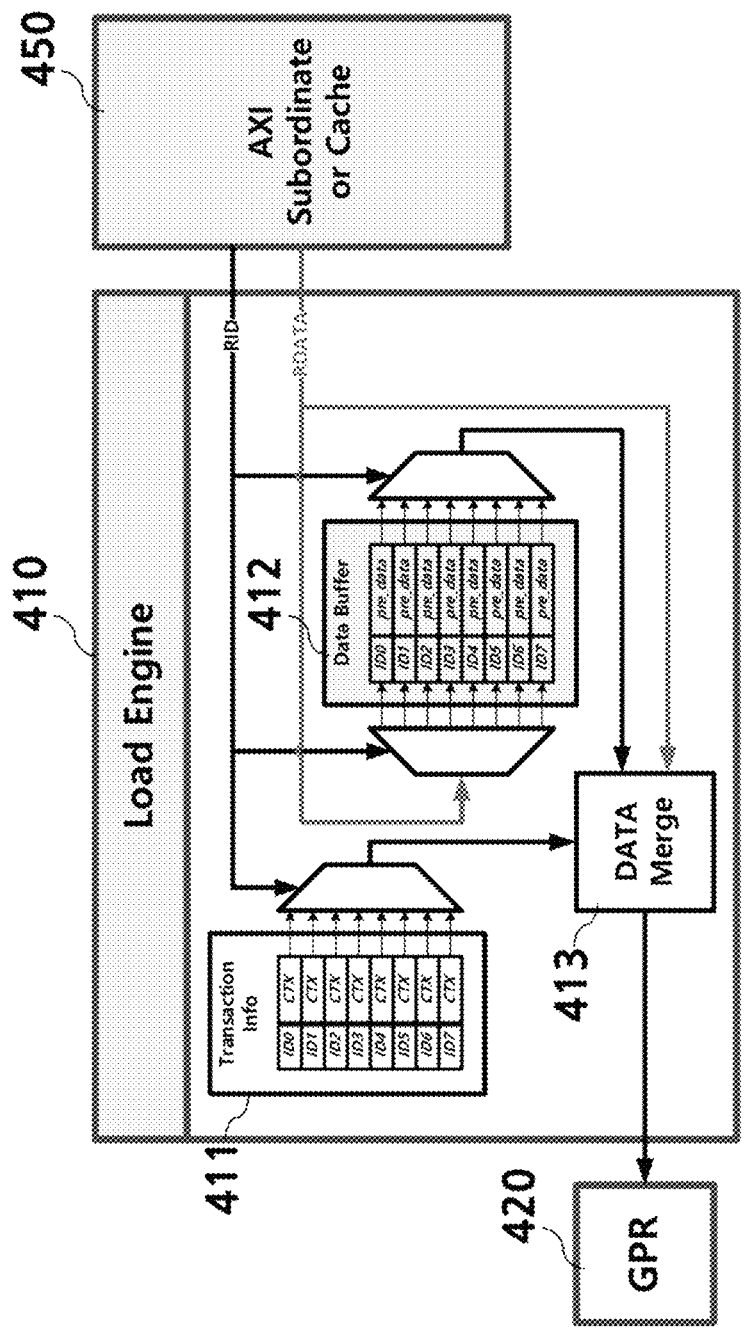
FIG. 4 is a diagram conceptually illustrating a comparative example for comparing with the processor for performing the method for processing transactions.

FIG. 4 is a diagram conceptually illustrating a comparative example for comparing with the processor for performing the method for processing transactions. FIG. 6 is a diagram conceptually illustrating a transaction processing operation according to the comparative example illustrated in FIG. 4.

In FIG. 4, a load engine 410 may correspond to the LSU 310 according to examples of the present disclosure. In addition, a transaction information unit 411, a data buffer unit 412, and a data merge unit 413 of FIG. 4 may correspond to the transaction information unit 311, the data buffer unit 312, and the data merge unit 313 according to the examples of the present disclosure, respectively.

According to bus protocol (e.g., AXI specification) that support interleaving, in the case of read, there is no order constraint between threads, and data may be alternately mixed and transferred for each thread. For example, as illustrated in FIG. 6, for threads with thread IDs R1, R2, and R3, respectively, data may be alternately mixed and transferred for each thread. Specifically, it is assumed that R1 and R3 are threads in which division conversion is performed according to S141 of FIGS. 1, and R2 is a thread in which division conversion is not performed. For example, it is assumed that a plurality of data units D11 and D12 are transferred for R1, one data unit D2 is transferred for R2, and a plurality of data units D31 and D32 are transferred for R3. Because interleaving is supported, data may be alternately mixed and transferred to threads R1, R2, and R3, respectively, as illustrated in FIG. 6.

In this case, even if the load engine 410 receives D11 for R1 first, the processing for R1 is not complete before D12 is received. Nevertheless, since the interleaving function is supported, other data units D31 and D2 may be received by the load engine 410. Therefore, D11 received before D12 should be stored in a separate buffer 412 before D12 is received within the load engine 410 and merged with D11. This is because, as described above, for the transaction converted into multiple transactions, the load engine 410 must aggregate and re-convert (merge) all the data units received for the transaction to perform an internal operation. Eventually, the previously received data unit (e.g., D11) should be stored in the data buffer unit 412 until the last data unit (e.g., D12) is received.

Meanwhile, because the load engine 410 should process multiple transactions and there is no order relationship between these transactions, a separate buffer space for storing the previously received data unit should be provided for each thread identifier (ID) identifying the transaction. That is, as illustrated in FIG. 4, the data buffer unit 412 should have a separate storage space as many as the number of thread identifiers ID0 to ID7 stored in the transaction information unit 411. As the number of thread identifiers increases, the space and complexity required for chip design will inevitably increase. As illustrated in FIG. 4, it is natural that more storage space of the data buffer unit 412 is required for each thread identifiers ID0 to ID7, and there is also a problem that a selector (e.g., MUX or selector) for selectively using a specific storage space should be further provided within the data buffer unit 412.

In comparison, the transaction processing method according to examples of the present disclosure has the advantage of efficiently designing the storage space of the data buffer unit 312 by utilizing interleaving deactivation information. Hereinafter, a technique for processing transactions according to examples of the present disclosure, which is capable of overcoming the shortcomings of the comparative example illustrated in FIGS. 4 and 6 will be described with reference to FIGS. 5, 7 and 8.

Figure 5:
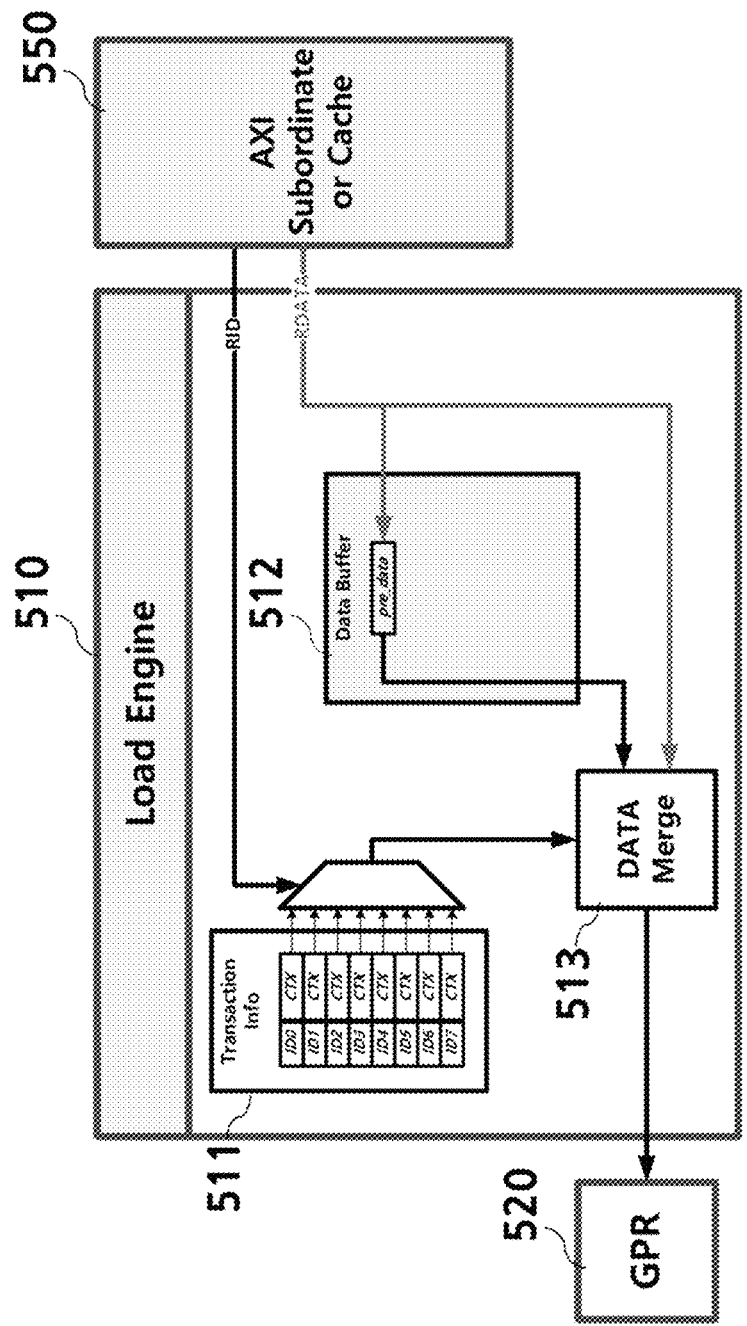
FIG. 5 is a diagram conceptually illustrating a processor for performing a method for processing transactions.
Figure 7:
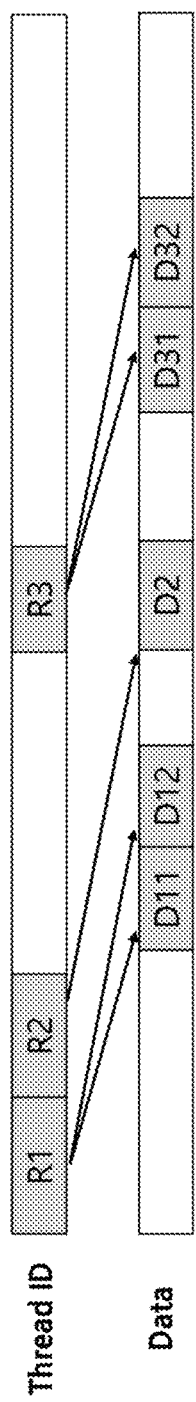
FIGS. 7 and 8 are diagrams conceptually illustrating the transaction processing operation illustrated in FIG. 5.
Figure 8:
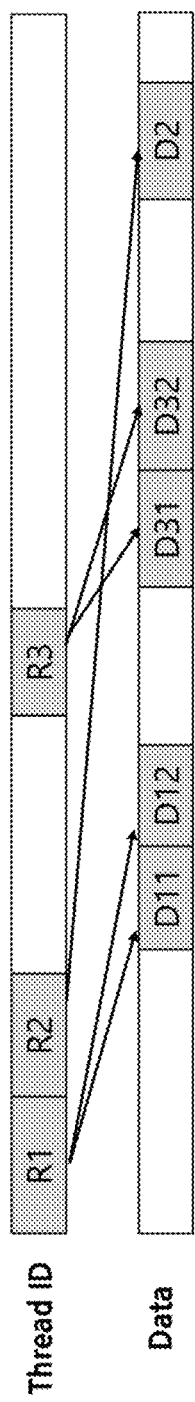

FIG. 5 is a diagram conceptually illustrating a processor for performing a method for processing transactions. FIGS. 7 and 8 are diagrams conceptually illustrating the transaction processing operation illustrated in FIG. 5.

In FIG. 5, a load engine 510 may correspond to the LSU 310 described above with reference to FIG. 3. In addition, a transaction information unit 511, a data buffer unit 512, and a data merge unit 513 of FIG. 5 may correspond to the transaction information unit 311, the data buffer unit 312, and the data merge unit 313 according to examples of the present disclosure illustrated in FIG. 3, respectively.

According to examples of the present disclosure, the load engine 510 may be configured to further transfer interleaving deactivation information that causes a subordinate or cache 550 to deactivate interleaving. If the interleaving deactivation information is transferred, the interleaving operation through the bus may be temporarily stopped. In this case, the receiving, by the load engine 510, a plurality of data units related to the second transactions from the subordinate or cache 550 may include storing, by the subordinate or cache 550 receiving the interleaving deactivation information, at least some of the plurality of data units in the data buffer 512 in the load engine 510. The plurality of data units may all be associated with the same thread.

For example, as illustrated in FIG. 7, it may be assumed that data is transferred for each thread for threads with thread IDs R1, R2, and R3, respectively. As illustrated in FIG. 7, a plurality of data units for one thread may all be transferred sequentially.

Specifically, it is assumed that R1 and R3 are threads in which division conversion is performed according to S141 of FIGS. 1, and R2 is a thread in which division conversion is not performed. For example, it is assumed that a plurality of data units D11 and D12 are transferred for R1, one data unit D2 is transferred for R2, and a plurality of data units D31 and D32 are transferred for R3. Because interleaving is not supported, data related to other threads cannot be alternately mixed and transferred until the data transfer for each thread is complete for threads R1, R2, and R3, as illustrated in FIG. 7.

In this case, when R1 receives D11 first, the other data units D2, D31, and D32 may not be received by the load engine 510 before D12 is received. This is because the interleaving function is temporarily stopped by the interleaving deactivation information.

Figure 6:
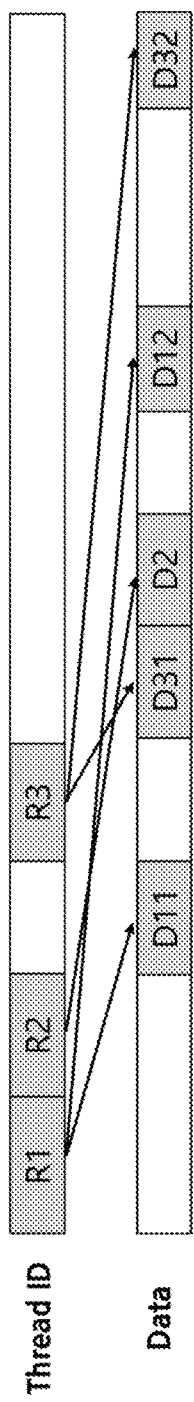
FIG. 6 is a diagram conceptually illustrating a transaction processing operation according to the comparative example illustrated in FIG. 4.

In the comparative example illustrated in FIG. 4, the buffer 412 for all of the plurality of thread identifiers is provided in the load engine 410, but in the example of the present disclosure illustrated in FIG. 6, it is not necessary to have the buffers for all of the plurality of thread identifiers in the load engine 510. For the individual transaction converted into multiple transactions before being transferred by the load engine 510 to the subordinate or cache 550, at least one data buffer unit 512 is only required because the load engine 510 should re-convert (merge) the received data units. That is, it is not necessary to have the buffers for a plurality of thread identifiers, and only a buffer for one thread identifier may be required.

While interleaving is deactivated, the data buffer unit 512 only needs to store the data unit (e.g., D11) previously received in relation to a specific thread identifier (e.g., R1) in the buffer 512 until the last data unit (e.g., D12) for the specific thread identifier (e.g., R1) is received and merged in the data merge unit 513.

Therefore, according to the examples of the present disclosure, regardless of the number of thread identifiers ID0 to ID7 stored in the transaction information unit 511, the data buffer unit 512 may include only a storage space for at least one thread identifier. Therefore, according to the examples of the present disclosure, even if the number of thread identifiers increases, the space and complexity required for chip design no longer need to increase, and there is an advantage in that an area and power for the internal data buffer can be optimized, and the overall computing performance can also be improved.

The merging the plurality of data units by the load engine 510 may be performed by the data merge unit 513. For example, while the interleaving function is temporarily stopped, if the last data unit D12 of the plurality of data units D11 and D12 associated with one thread R1 is received by the load engine 510, the load engine 510 may merge the data unit(s) D11 already stored in the data buffer 512 with the last data unit D12. Meanwhile, there may be one data unit D11 that has been previously stored before the last data unit D12 is received, but this is merely an example and a plurality of data units may have been previously stored. For example, depending on the methods of implementation, the data units D11, D12, D13, and DIN may all be related to the same thread identifier.

The interleaving function may be reactivated again after being deactivated. It is to be noted, for example, that once deactivated interleaving function is not ultimately continuously unavailable while the system is in use. An example of an operation of reactivating the interleaving function will be described with reference to FIG. 8.

For example, the load engine 510 may cause the subordinate or cache 550 to reactivate interleaving after merging a plurality of data units and transferring the merged data to a register 520 (e.g., GPR). For example, the LSU 310 (or the load engine 510) may be configured to transfer interleaving activation information that causes the subordinate or cache 350 and 550 to reactivate interleaving, after the merging (S162) or the register loading (S180) of FIG. 2.

The interleaving activation information may be signaled in the same or similar manner as the interleaving deactivation information. For example, the interleaving activation information (or interleaving reactivation information) may be transferred using a user signal or a sideband signal of the AXI protocol.

In FIG. 8, it is also assumed that R1 and R3 are threads in which division conversion is performed according to S141 of FIGS. 1, and R2 is a thread in which division conversion is not performed. For example, it is assumed that a plurality of data units D11 and D12 are transferred for R1, one data unit D2 is transferred for R2, and a plurality of data units D31 and D32 are transferred for R3.

As illustrated in FIG. 8, if all of the plurality of data units D11 and D12 are transferred and merged with respect to the thread identifier R1, then the interleaving activation information may be signaled. Thus, the interleaving function in the bus between the LSU 310 and the subordinate or cache 350 may be reactivated.

For example, the interleaving function may be reactivated after processing for R1. Thus, when the processing for the thread identifier R2 starts, the request of R2 may be transferred to the subordinate or cache 350 through the LSU 310 while the interleaving function is activated. In addition, it is assumed that the request of the thread identifier R3 is additionally transferred to the subordinate or cache 350 through the LSU 310 while the processing for R2 is not complete.

If R2 receives its data unit D2 earlier than R3 receives its first data unit D31, it can be understood that data transmission and merging are sequentially processed in the same manner as in the example illustrated in FIG. 7.

However, if the first data unit D31 of R3 is transferred earlier than the data unit D2 of R2, data transmission and merging may be performed in the same manner as in the example illustrated in FIG. 8. If D31 is transferred earlier than D2, the interleaving function should be deactivated by R3 that processes D31. In this case, since the interleaving function is deactivated, D2 cannot be transferred between D31 and D32. After the reception of D32, the merging of D31 and D32 should be complete and loading into the register 320 for R3 should be complete, and then the processing for D2 can be performed.

In summary, since R2 does not process divided transactions, interleaving may be activated while the processing for R2 is in progress, but it can be understood that if the processing for R3 is initiated and the first data unit D31 for R3 is received before the processing for R2 is complete, D2 cannot be received until D32 is received.

The methods for processing multiple transactions converted from a single transaction according to some examples of the present disclosure have been described with reference to FIGS. 1 to 8. These methods may be performed by a processor including at least one core. As previously described, the "processor" may refer to a combination of processing devices such as general-purpose processors, central processing units (CPUs), microprocessors, digital signal processors (DSPs), controllers, microcontrollers, state machines, on-demand semiconductors (ASICs), programmable logic devices (PLDs), field programmable gate arrays (FPGA), a combination of DSPs and microprocessors, a combination of a plurality of microprocessors, a combination of one or more microprocessors combined with DSP cores, or any other combination of such configurations. In addition, the processor may be a general-purpose processor that can execute software to perform that specific operation. In addition, the processor may include all or at least some of the components described with reference to FIG. 3.

The methods in accordance with the present disclosure may be computer-implemented methods. Although each step of the corresponding methods has been illustrated and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

The invention claimed is:

1. A method for processing multiple transactions converted from a single transaction for each thread of a plurality of threads, the method being performed by a processor including at least one core and comprising:
converting a first transaction related to at least one of the plurality of threads into a plurality of second transactions;
transferring, by a load-store unit (LSU) of the core, the plurality of second transactions to a subordinate or a cache;
receiving, by the LSU, a plurality of data units related to the second transactions from the subordinate or the cache; and
merging, by the LSU, the plurality of data units,
wherein the LSU is configured to further transfer interleaving deactivation information that causes the subordinate or the cache to deactivate interleaving.

2. The method according to claim 1, wherein the interleaving deactivation information is transferred using a user signal or a sideband signal of AXI protocol.

3. The method according to claim 1, wherein the subordinate or the cache receiving the interleaving deactivation information is configured to sequentially transfer the plurality of data units to the LSU such that data for threads other than the at least one thread is not mixed.

4. The method according to claim 1, wherein the receiving, by the LSU, the plurality of data units related to the second transactions from the subordinate or the cache includes: storing, by the subordinate or the cache receiving the interleaving deactivation information, at least some of the plurality of data units in a data buffer in the LSU, and wherein the plurality of data units are all associated with a same thread.

5. The method according to claim 4, wherein the merging, by the LSU, the plurality of data units includes: when a last data unit of the plurality of data units is received by the LSU, merging, by the LSU, the last data unit and the data units stored in the data buffer.

6. The method according to claim 1, wherein, after the merging by the LSU the plurality of data units, the LSU is configured to transfer interleaving activation information that causes the subordinate or the cache to reactivate interleaving.

7. A processor for performing a method for processing multiple transactions converted from a single transaction for each of the plurality of threads,
  wherein the processor includes at least one core,
  wherein the method includes:
  converting a first transaction related to at least one of the plurality of threads into a plurality of second transactions;
  transferring, by a load-store unit (LSU) of the core, the plurality of second transactions to a subordinate or a cache;
  receiving, by the LSU, a plurality of data units related to the second transactions from the subordinate or the cache; and
  merging, by the LSU, the plurality of data units, and
  wherein the LSU is configured to further transfer interleaving deactivation information that causes the subordinate or the cache to deactivate interleaving.

8. The processor according to claim 7, wherein the interleaving deactivation information is transferred using a user signal or a sideband signal of AXI protocol.

9. The processor according to claim 7, wherein the subordinate or the cache receiving the interleaving deactivation information is configured to sequentially transfer the plurality of data units to the LSU such that data for threads other than the at least one thread is not mixed.

10. The processor according to claim 7, wherein the receiving, by the LSU, the plurality of data units related to the second transactions from the subordinate or the cache includes: storing, by the subordinate or the cache receiving the interleaving deactivation information, at least some of the plurality of data units in a data buffer in the LSU, and wherein the plurality of data units are all associated with a same thread.

11. The processor according to claim 10, wherein the merging, by the LSU, the plurality of data units includes: when a last data unit of the plurality of data units is received by the LSU, merging, by the LSU, the last data unit and the data units stored in the data buffer.

12. The processor according to claim 7, wherein, after the merging by the LSU the plurality of data units, the LSU is configured to transfer interleaving activation information that causes the subordinate or the cache to reactivate interleaving.

\* \* \* \* \*